United States Patent
Bian

(10) Patent No.: US 9,774,282 B2
(45) Date of Patent: Sep. 26, 2017

(54) METHOD FOR CONTROLLING THREE-PHASE BRUSHLESS DC MOTOR COMPRISING SINGLE HALL SENSOR

(71) Applicant: Zhongshan Broad-Ocean Motor Manufacturing Co., Ltd., Zhongshan (CN)

(72) Inventor: Wenqing Bian, Zhongshan (CN)

(73) Assignee: ZHONGSHAN BROAD-OCEAN MOTOR MANUFACTURING CO., LTD., Zhongshan (CN)

( * ) Notice: Subject to any disclaimer, the term of this patent is extended or adjusted under 35 U.S.C. 154(b) by 0 days.

(21) Appl. No.: 14/621,419

(22) Filed: Feb. 13, 2015

(65) Prior Publication Data

US 2015/0162860 A1    Jun. 11, 2015

Related U.S. Application Data

(63) Continuation-in-part of application No. PCT/CN2013/085844, filed on Oct. 24, 2013.

(30) Foreign Application Priority Data

Aug. 30, 2013    (CN) .......................... 2013 1 0390774

(51) Int. Cl.
*H02K 29/08*        (2006.01)
*H02P 6/16*         (2016.01)
(Continued)

(52) U.S. Cl.
CPC ................ *H02P 6/16* (2013.01); *H02P 6/085* (2013.01); *H02P 6/17* (2016.02)

(58) Field of Classification Search
CPC .. H02P 6/16; H02P 6/145; H02P 9/009; H02P 21/0039; H02P 23/005; H02P 25/023
(Continued)

(56) References Cited

U.S. PATENT DOCUMENTS 4,546,293 A * 10/1985 Peterson ................. H02P 6/145
                                                  318/400.14
4,651,068 A *  3/1987 Meshkat-Razavi ..... H02P 6/002
                                                  318/400.02
(Continued)

OTHER PUBLICATIONS

Zou et al., Sinusoidal Commutation of A High-Speed PM Synchronous Motor with One Discrete Hall Sensor, Oct. 20-24, 2002, IEEE, pp. 115-119.*

*Primary Examiner* — Bickey Dhakal
(74) *Attorney, Agent, or Firm* — Matthias Scholl P.C.; Matthias Scholl

(57) ABSTRACT

A method for controlling a three-phase brushless DC motor including a single hall sensor, the method including: A) measuring a deviation angle $\theta$ of a mounting position of the single hall sensor and storing; B) starting the motor: outputting six-path PWM signals by the microprocessor to control the operation of the inverter and allowing the single hall sensor to continuously and stably measure a position signal; C) obtaining a rotating angular velocity $\omega=360°/T$ in the last 360° electric angle cycle by the microprocessor; D) calculating a real-time position angle $\alpha=\omega t+\theta$ of a present 360° electric angle cycle by the microprocessor; and E) outputting the six-path PWM signals by the microprocessor to control the operation of the inverter so as to simultaneously energize the three-phase winding (U, V, and W); and switching a current direction of each winding.

3 Claims, 6 Drawing Sheets

(51) Int. Cl.
*H02P 6/08* (2016.01)
*H02P 6/17* (2016.01)

(58) Field of Classification Search
USPC .......................... 318/400.38, 652, 721, 823
See application file for complete search history.

(56) References Cited

U.S. PATENT DOCUMENTS

| | | | | |
|---|---|---|---|---|
| 6,002,234 | A * | 12/1999 | Ohm | H02P 6/142 |
| | | | | 318/438 |
| 6,316,895 | B1 * | 11/2001 | Ramarathnam ... | H02M 7/53873 |
| | | | | 318/256 |
| 7,885,785 | B1 * | 2/2011 | Pekarek | H02P 6/10 |
| | | | | 318/400.01 |
| 9,035,580 | B2 * | 5/2015 | Suzuki | H02P 21/14 |
| | | | | 318/400.02 |
| 2010/0283414 | A1 * | 11/2010 | Jun | D06F 37/304 |
| | | | | 318/400.02 |
| 2016/0094165 | A1 * | 3/2016 | Lee | H02P 6/165 |
| | | | | 318/400.06 |

\* cited by examiner

METHOD FOR CONTROLLING THREE-PHASE BRUSHLESS DC MOTOR COMPRISING SINGLE HALL SENSOR

CROSS-REFERENCE TO RELATED APPLICATIONS

This application is a continuation-in-part of International Patent Application No. PCT/CN2013/085844 with an international filing date of Oct. 24, 2013, designating the United States, now pending, and further claims priority benefits to Chinese Patent Application No. 201310390774.5 filed Aug. 30, 2013. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a method for controlling a three-phase brushless DC motor comprising a single hall sensor.

Description of the Related Art

A typical three-phase brushless motor necessitates three hall sensors and adopts conventional six-step commutation to realize normal operation of the motor. Some motors exhibit absence of the three hall sensors and thus requires relatively complicate algorithms to acquire a real-time position of the rotor, particularly for motors driven by sine waveforms. To calculate the position of the motor, a mathematic model of the motor should be known in advance. In addition, the estimated angle is significantly affected by parameter changes of the motor, resulting in inaccurate control.

SUMMARY OF THE INVENTION

In view of the above-described problems, it is one objective of the invention to provide a method for controlling a three-phase brushless DC motor comprising a single hall sensor. The method has simple algorithm and accurate control, saves the operating resource of the microprocessor, and decreases the production cost.

To achieve the above objective, in accordance with one embodiment of the invention, there is provided a method for controlling a three-phase brushless DC motor. The three-phase brushless DC motor comprises: a motor body and a motor controller. The motor body comprises: a permanent magnet rotor assembly and a stator assembly. The stator assembly comprises a stator core and a three-phase winding (U, V, and W). The motor controller comprises: a microprocessor, an inverter, and only one hall sensor. An output end of the inverter is connected to the three-phase winding (U, V, and W). The hall sensor sends a signal of a rotor position to the microprocessor. The microprocessor outputs six-path PWM signals to control operation of the inverter. The method comprises the following steps:

A) measuring a deviation angle θ of a mounting position of the hall sensor, and storing the deviation angle;
B) outputting the six-path PWM signals by the microprocessor to control the operation of the inverter, whereby enabling the stator to produce a rotating magnetic field operating at a certain velocity, enabling the rotor of the motor to rotate at a certain velocity V0, and enabling the hall sensor to continuously and stably measure a position signal;
C) measuring a time segment T of the hall sensor within a last 360° electric angle cycle by the microprocessor and obtaining a rotating angular velocity ω=360°/T in the last 360° electric angle cycle;
D) calculating a real-time position angle α=ωt+θ of a present 360° electric angle cycle by the microprocessor, in which ω represents the rotating angular velocity of the last 360° electric angle cycle and t represents a time; and
E) outputting the six-path PWM signals by the microprocessor to control the operation of the inverter so as to simultaneously energize the three-phase winding (U, V, and W); and switching a current direction of each winding according to the following equations:

$$U = Ev \times \sin\alpha$$

$$V = Ev \times \sin(\alpha + 120°)$$

$$W = Ev \times \sin(\alpha + 240°)$$

in which, Ev represents an average voltage of each energized phase winding; the U-phase winding is reversed at α=0° and 180° within the 360° electric angle cycle, the V-phase winding is reversed at α=60° and 240° within the 360° electric angle cycle, and the W-phase winding is reversed at α=120° and 300°.

In a class of this embodiment, in step E), Ev=Vdc×K, in which Vdc represents a bus supply voltage of the motor, K represents a duty ratio of the PWM signal output by the microprocessor.

In a class of this embodiment, a phase advance angle β is preferably introduced to step E) to eliminate influence of current lags. A current direction of each phase of the three-phase winding is switched according to the following equations:

$$U = Ev \times \sin(\alpha + \beta)$$

$$V = Ev \times \sin(\alpha + \beta + 120°)$$

$$W = Ev \times \sin(\alpha + \beta + 240°)$$

that is, the U-phase winding is reversed at α+β=0° and 180° within the 360° electric angle cycle; the V-phase winding is reversed at α+=60° and 240° within the 360° electric angle cycle; and the W-phase winding is reversed at α+β=120° and 300°.

Compared with related prior art, the method of the invention is advantageous in the following aspects: 1) The invention adopts the hall sensor to detect the rotor position, utilizes simple control algorithm to acquire the position signal, and uses the simple algorithm to control the three-phase winding to simultaneously supply power so as to drive the motor. In summary, the invention has simple algorithm, accurate control, and lowered production cost, and saves the operating resource of the microprocessor. 2) The phase advance angle β is introduced to eliminate the influence of the current lags, thereby making the control more accurate.

BRIEF DESCRIPTION OF THE DRAWINGS

The invention is described hereinbelow with reference to the accompanying drawings, in which.

DETAILED DESCRIPTION OF THE EMBODIMENTS

Figure 1:
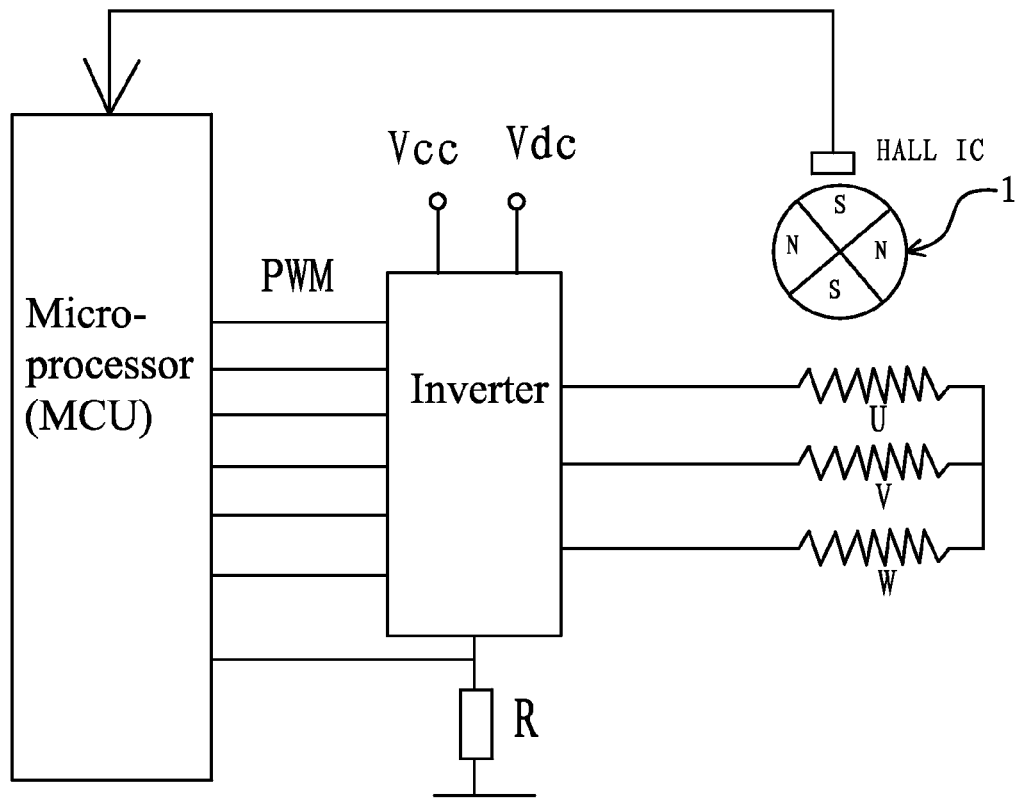
FIG. 1 is a schematic circuit diagram of a three-phase DC brushless motor in accordance with one embodiment of the invention.

For further illustrating the invention, experiments detailing a method for controlling a three-phase DC brushless motor comprising a single hall sensor are described below. It should be noted that the following examples are intended to describe and not to limit the invention.

As shown in FIGS. 1-4, a three-phase DC brushless motor comprising a single hall sensor comprises a motor body and a motor controller. The motor body comprises a permanent rotor assembly 1 and a stator assembly. The stator assembly comprises a stator core and a three-phase winding U, V, and W. The motor controller comprises: a microprocessor, an inverter, and a single hall sensor HALL IC. An output end of the inverter is connected to the three-phase winding U, V, and W. The single hall sensor HALL IC sends a signal of a rotor position to the microprocessor. The microprocessor outputs six-path PWM signals to control operation of the inverter. The inverter comprises three bridge arms formed by six electric switches Q1, Q2, Q3, Q4, Q5, and Q6. The microprocessor outputs six paths P1, P2, P3, P4, P5, and P6 PWM signals to control the opening or closing of the electric switches Q1, Q2, Q3, Q4, Q5, and Q6.

A method for controlling a three-phase DC brushless motor comprising the single hall sensor comprises the following steps:

A) measuring a deviation angle $\theta$ of a mounting position of the single hall sensor, and storing the deviation angle;

B) outputting the six-path PWM signals by the microprocessor to control the operation of the inverter so that the stator produces a rotating magnetic field operating at a certain velocity and the rotor of the motor start to rotate at a certain rotational velocity V0, and the single hall sensor start to continuously and stably measure a position signal;

C) measuring a time segment T of the hall sensor within a last 360° electric angle cycle by the microprocessor and obtaining a rotating angular velocity $\omega=360°/T$ in the last 360° electric angle cycle;

D) calculating a real-time position angle $\alpha=\omega t+\theta$ of a present 360° electric angle cycle by the microprocessor, in which ω represents the rotating angular velocity of the last 360° electric angle cycle and t represents a time; and E) outputting the six-path PWM signals by the microprocessor to control the operation of the inverter so as to simultaneously energize the three-phase winding (U, V, and W); and switching a current direction of each winding according to the following equations:

$U=Ev \times \sin \alpha$ $V=Ev \times \sin(\alpha+120°)$ $W=Ev \times \sin(\alpha+240°)$ in which, Ev represents an average voltage of each energized phase winding.

That is, the U-phase winding is reversed at $\alpha=0°$ and 180° within the 360° electric angle cycle, the V-phase winding is reversed at $\alpha=60°$ and 240° within the 360° electric angle cycle, and the W-phase winding is reversed at $\alpha=120°$ and 300°.

In step E), $Ev=Vdc \times K$, in which Vdc represents a bus supply voltage of the motor, K represents a duty ratio of the PWM signal output by the microprocessor.

A phase advance angle β is preferably introduced into step E) to eliminate influence of current lags. A current direction of each phase of the three-phase winding is switched according to the following equations:

$U=Ev \times \sin(\alpha+\beta)$ $V=Ev \times \sin(\alpha+\beta+120°)$ $W=Ev \times \sin(\alpha+\beta+240°)$ That is, the U-phase winding is reversed at $\alpha+\beta=0°$ and 180° within the 360° electric angle cycle; the V-phase winding is reversed at $\alpha+\beta=60°$ and 240° within the 360° electric angle cycle; and the W-phase winding is reversed at $\alpha+\beta=120°$ and 300°.

Figure 2:
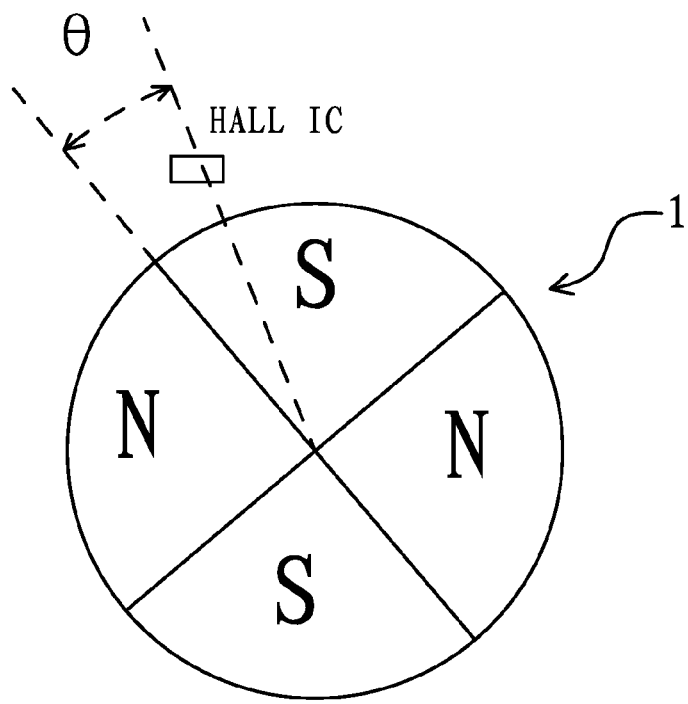
FIG. 2 is an installation diagram of a permanent rotor and a hall sensor in accordance with one embodiment of the invention.
Figure 3:
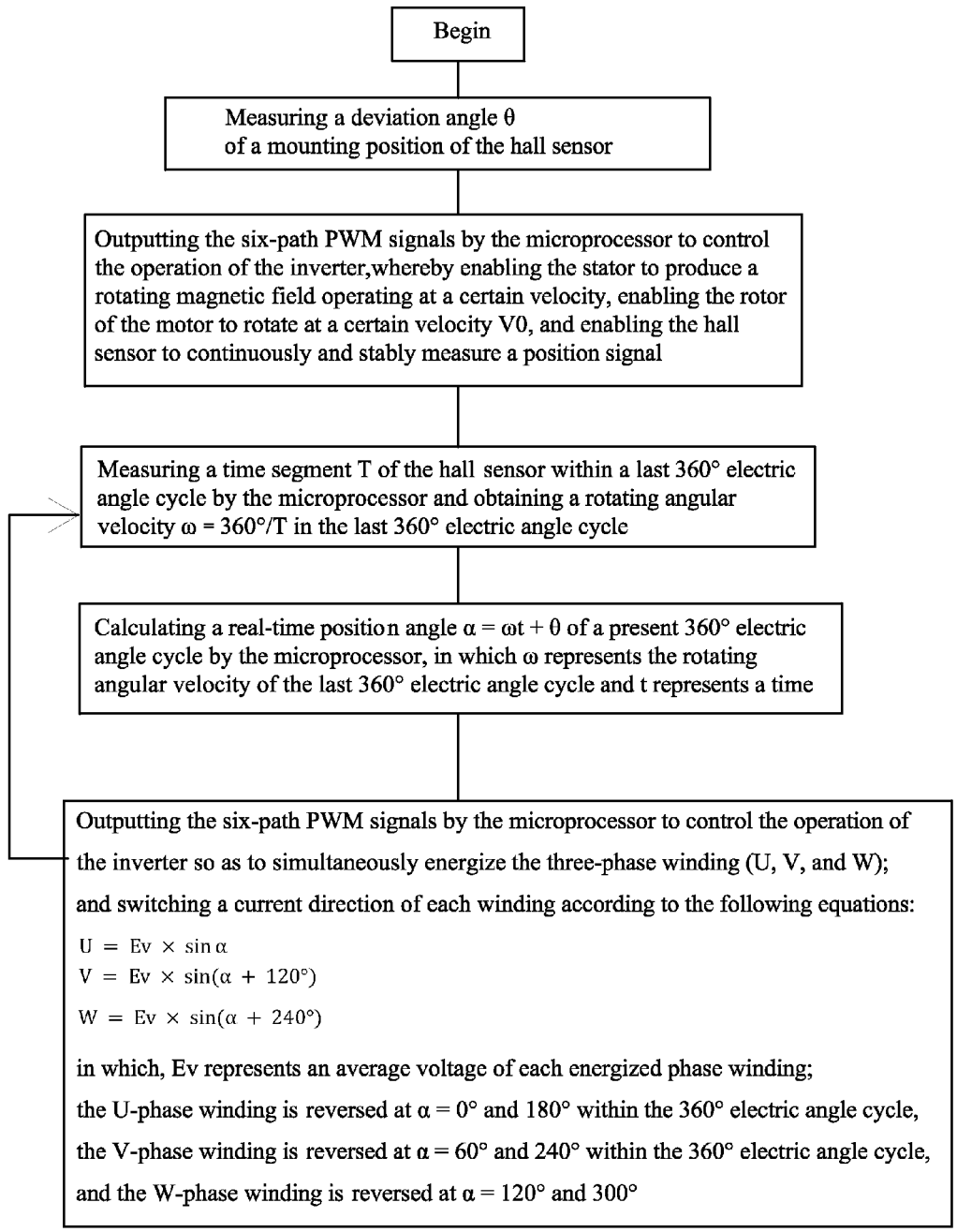
FIG. 3 is a flow chart of control of a three-phase DC brushless motor in accordance with one embodiment of the invention.
Figure 4:
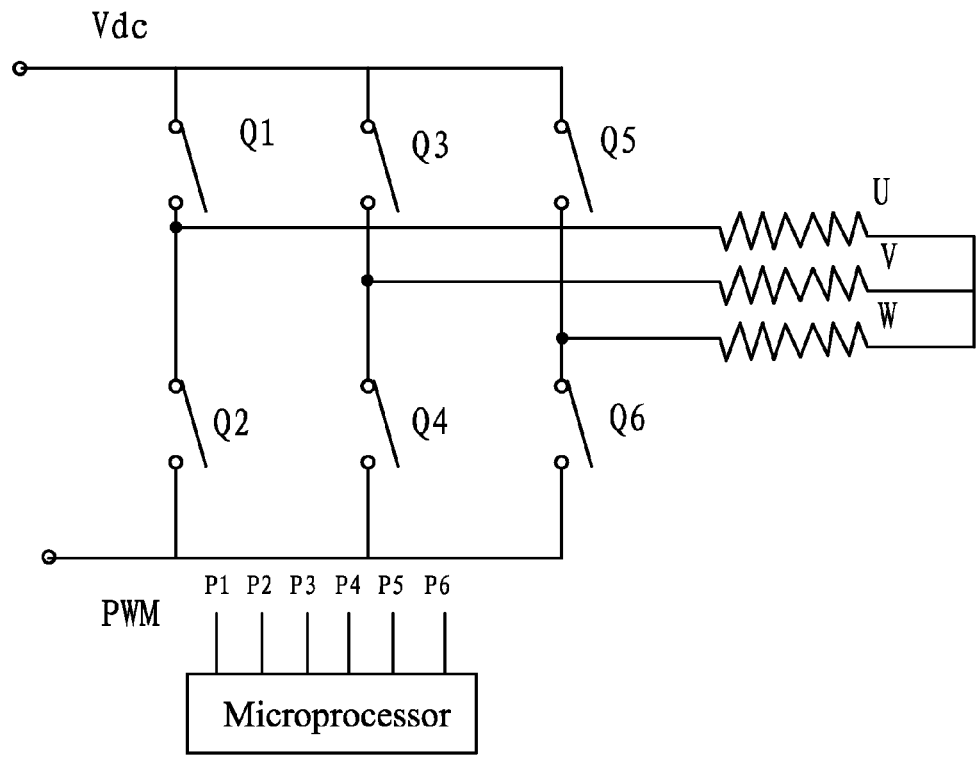
FIG. 4 is a specific expended diagram of FIG. 2.

Principle of the invention is as follows:

The single hall sensor HALL IC is adopted to measure the rotor position, as known by persons skilled in the art, a rotor has a number P of pole-pairs, and when the rotor rotates for a circle, the hall sensor measures P sine waveform, that is, a total electric angle =P×360°. Two pairs of poles are illustrated in FIG. 2, each poles pair comprises an N pole and an S pole, then if the rotor rotates for one circle, the hall sensor measures two sine waveforms, that is, the total electric angle =2×360°=720°. Assuming that an install position of the hall sensor HALL IC is not located at 0° but has some deviation, and assuming the position deviation angle of the installation of the hall sensor is θ=10°, assuming that the microprocessor measures a time segment 0.5 s of the hall sensor within the last 360° electric angle cycle, then rotating angular velocity ω=360°/T in a last 360° electric angle cycle is acquired. As shown in FIGS. 5-11, work states of the electric switches Q1, Q2, Q3, Q4, Q5, and Q6 within the present 360° electric angle cycle can be calculated.

Figure 5:
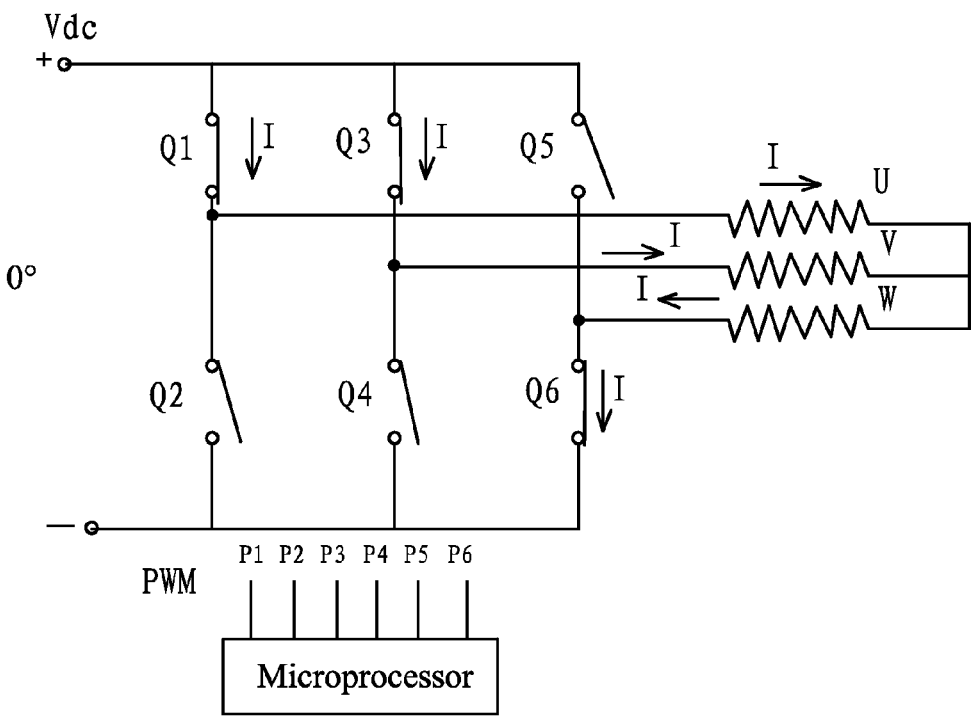
FIG. 5 is a diagram of a first work state of electric switches of an inverter in accordance with one embodiment of the invention.

As shown in FIG. 5, when $\alpha=\omega t+\theta=0°$, the electric switches Q1, Q3, and Q6 are connected while the electric switches Q2, Q4, and Q5 are disconnected, a current passing through the U-phase winding is from left to right, a current passing through the V-phase winding is from left to right, and a current passing through the W-phase winding is from right to left.

Figure 6:
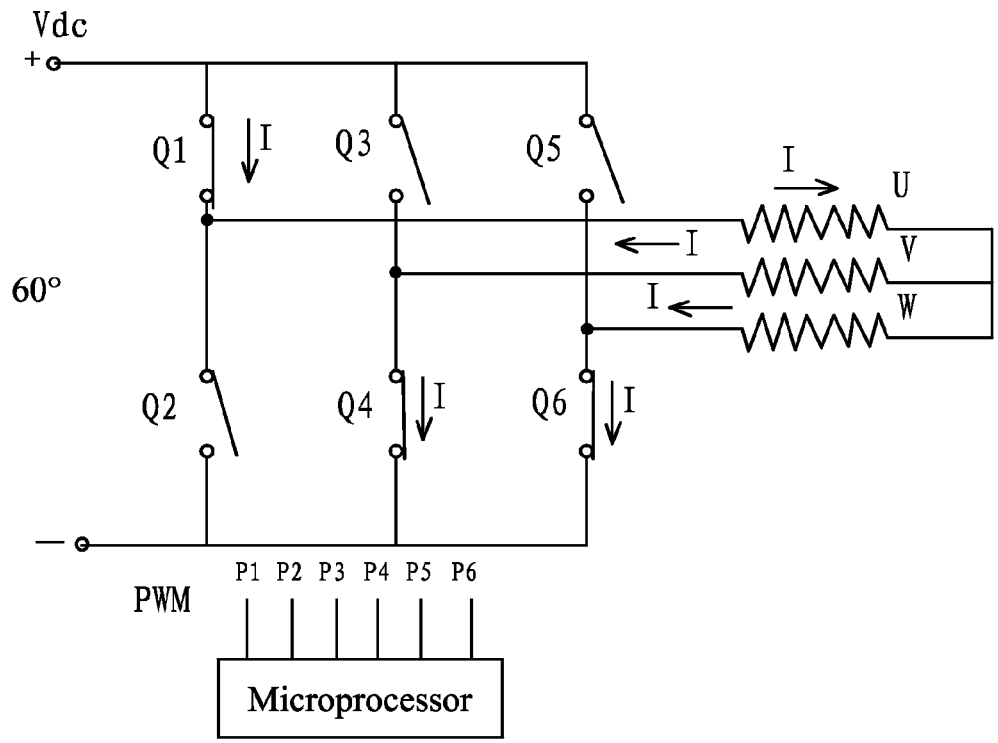
FIG. 6 is a diagram of a second work state of electric switches of an inverter in accordance with one embodiment of the invention.

As shown in FIG. 6, when α=ωt+θ =60°, the electric switches Q1, Q4, and Q6 are connected while the electric switches Q2, Q3, and Q5 are disconnected, a current passing through the U-phase winding is from left to right, a current passing through the V-phase winding is from right to left, and a current passing through the W-phase winding is from right to left.

Figure 7:
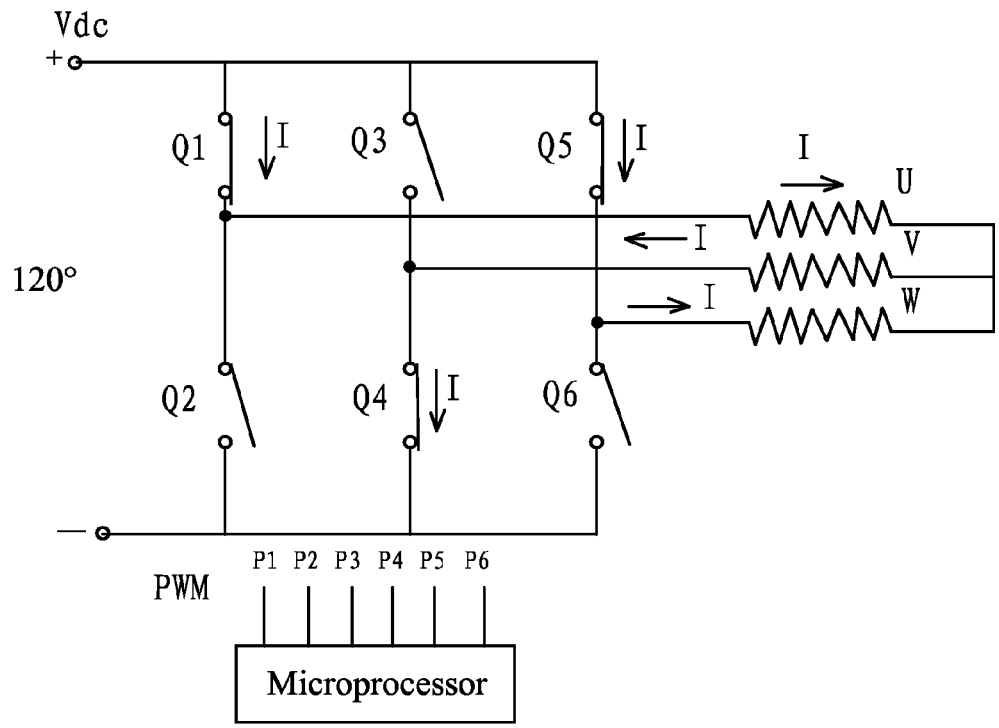
FIG. 7 is a diagram of a third work state of electric switches of an inverter in accordance with one embodiment of the invention.

As shown in FIG. 7, when α=ωt+θ =120°, the electric switches Q1, Q4, and Q5 are connected while the electric switches Q2, Q3, and Q6 are disconnected, a current passing through the U-phase winding is from left to right, a current passing through the V-phase winding is from right to left, and a current passing through the W-phase winding is from left to right.

Figure 8:
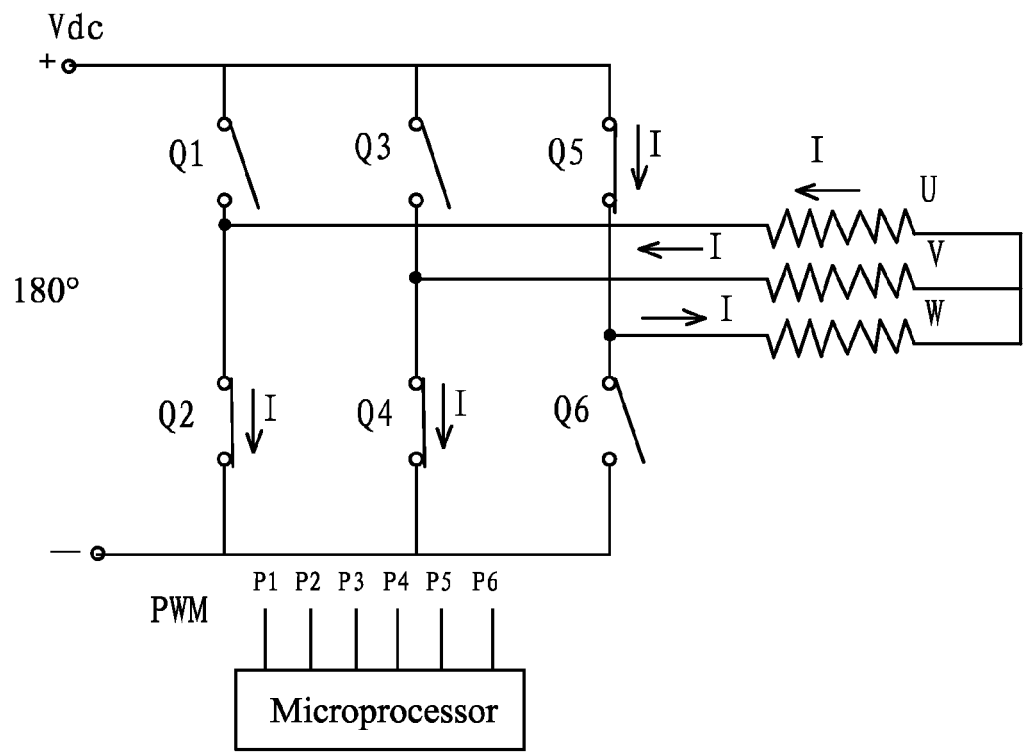
FIG. 8 is a diagram of a fourth work state of electric switches of an inverter in accordance with one embodiment of the invention.

As shown in FIG. 8, when α=ωt+θ =180°, the electric switches Q2, Q4, and Q5 are connected while the electric switches Q1, Q3, and Q6 are disconnected, a current passing through the U-phase winding is from right to left, a current passing through the
V-phase winding is from right to left, and a current passing through the W-phase winding is from left to right.

Figure 9:
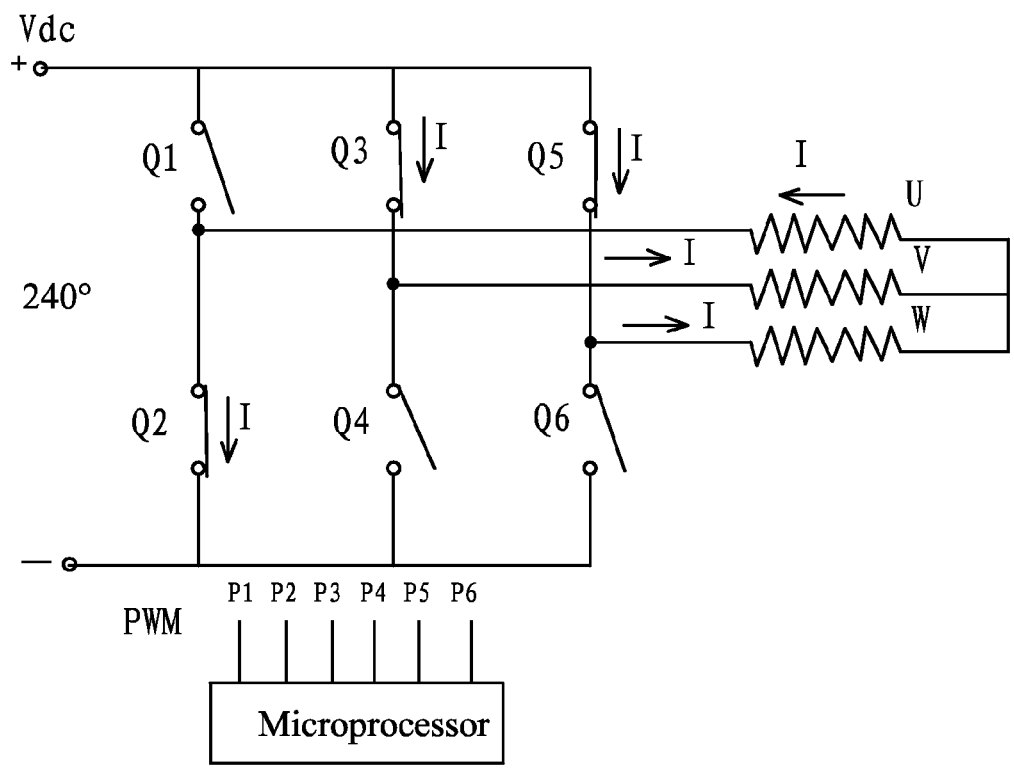
FIG. 9 is a diagram of a fifth work state of electric switches of an inverter in accordance with one embodiment of the invention.

As shown in FIG. 9, when α=ωt+θ =240°, the electric switches Q2, Q3, and Q5 are connected while the electric switches Q1, Q4, and Q6 are disconnected, a current passing through the U-phase winding is from right to left, a current passing through the V-phase winding is from left to right, and a current passing through the W-phase winding is from left to right.

Figure 10:
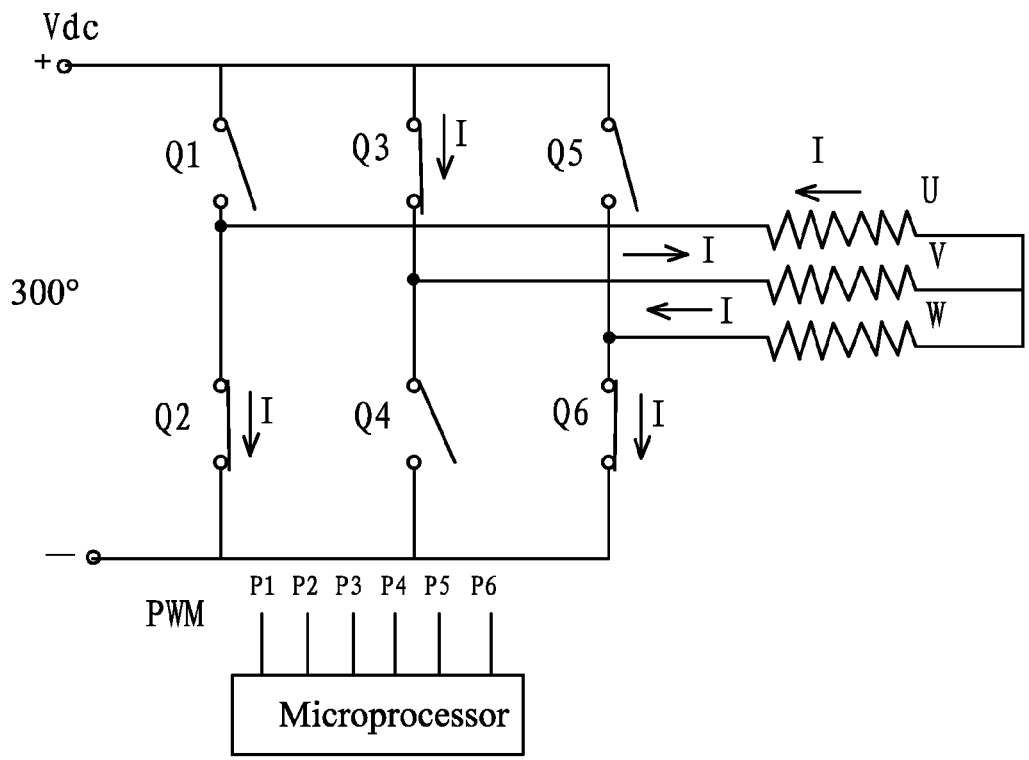
FIG. 10 is a diagram of a sixth work state of electric switches of an inverter in accordance with one embodiment of the invention.
Figure 11:
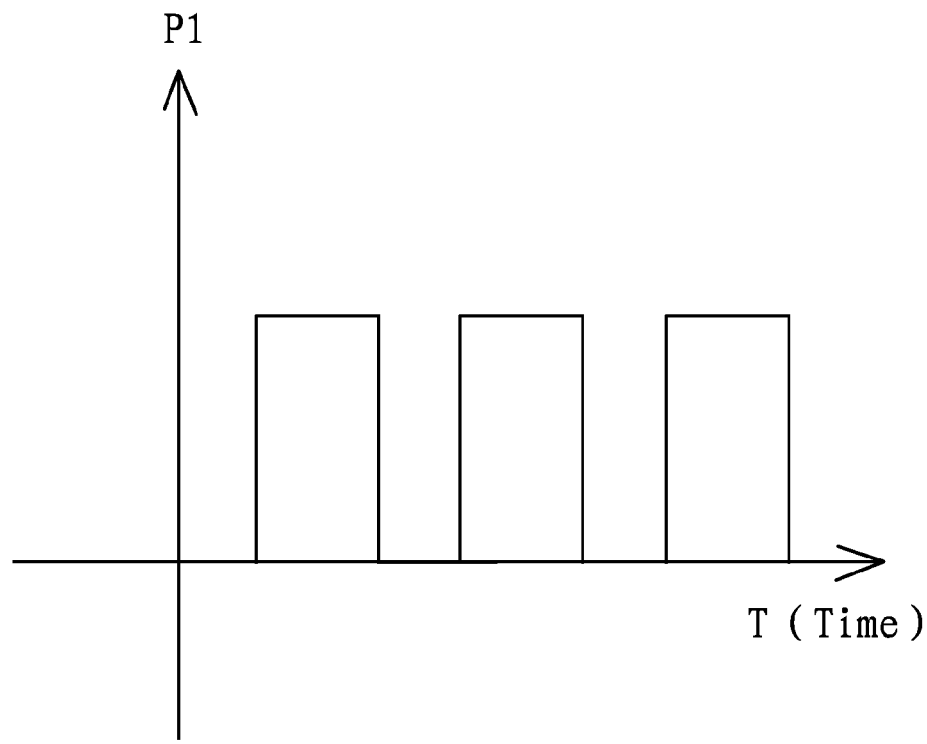
FIG. 11 is a sequence diagram of a connection time of electric switches in accordance with one embodiment of the invention.

As shown in FIG. 10, when α=ωt+θ =300°, the electric switches Q2, Q3, and Q6 are connected while the electric switches Q1, Q4, and Q5 are disconnected, a current passing through the U-phase winding is from right to left, a current passing through the V-phase winding is from left to right, and a current passing through the W-phase winding is from right to left.

The rotor then rotates for another 60°, and the electric angle returns to the state of FIG. 5.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A method for controlling a three-phase brushless DC motor, the three-phase brushless DC motor comprising:
   a) a motor body, the motor body comprising: a permanent magnet rotor assembly and a stator assembly; the stator assembly comprising a stator core and a three-phase winding (U, V, and W); the permanent magnet rotor assembly comprising a rotor comprising a plurality of magnetic poles; and
   b) a motor controller, the motor controller comprising: a microprocessor, an inverter, and a single hall sensor; an output end of the inverter being connected to the three-phase winding (U, V, and W), the single hall sensor sending a signal of a rotor position to the microprocessor, and allowing the microprocessor to output six-path PWM signals to control operation of the inverter;

the method comprising:
A) measuring a deviation angle (θ) between a start position of the rotor and a next position of the rotor, wherein when the rotor rotates to the next position, the single hall sensor is aligned with a boundary surface of the plurality of magnetic poles, and the deviation angle θ is a fixed constant value; and storing the deviation angle; and
B) outputting the six-path PWM signals by the microprocessor to control the operation of the inverter, whereby enabling the stator assembly to produce a rotating magnetic field, enabling the rotor to rotate for a plurality of cycles, each cycle having an electric angle of 360°, and enabling the single hall sensor to continuously measure a position signal, wherein for each cycle:
   1) measuring a time period T of the each cycle by the microprocessor and obtaining a rotating angular velocity (ω) of the rotor according to an equation ω=360°/T;
   2) creating a variable α as a function of time according to an equation α=ωt+θ by the microprocessor, in which t represents an arbitrary time in a next single cycle that follows the each cycle and is a variable, and α represents a real-time position angle of the rotor during the next single cycle; and
   3) outputting the six-path PWM signals by the microprocessor to control the operation of the inverter so as to simultaneously energize the three-phase winding (U, V, and W); and switching a current direction of each winding according to the following equations:

$U = Ev \times \sin \alpha$ $V = Ev \times \sin(\alpha + 120°)$ $W = Ev \times \sin(\alpha + 240°)$ in which, Ev represents an average voltage of each energized phase winding; the U-phase winding is reversed at α=0° and 180° within the next single cycle, the V-phase winding is reversed at α=60° and 240° within the next single cycle, and the W-phase winding is reversed at α=120° and 300° within the next single cycle.

2. The method of claim 1, wherein in B) 3), Ev=Vdc×K, in which Vdc represents a bus supply voltage of the motor, K represents a duty ratio of the PWM signal output by the microprocessor.

3. The method of claim 1, wherein
a phase advance angle (β) is introduced to B) 3) to eliminate influence of current lags; and
a current direction of each phase of the three-phase winding is switched according to the following equations:

$U = Ev \times \sin(\alpha + \beta)$ $V = Ev \times \sin(\alpha + \beta + 120°)$ $W = Ev \times \sin(\alpha + \beta + 240°)$ the U-phase winding is reversed at α+β=0° and 180° within the next single cycle; the V-phase winding is reversed at α+β=60° and 240° within the next single cycle; and the W-phase winding is reversed at α+β=120° and 300° within the next single cycle.

* * * * *